United States Patent Office 3,475,317
Patented Oct. 28, 1969

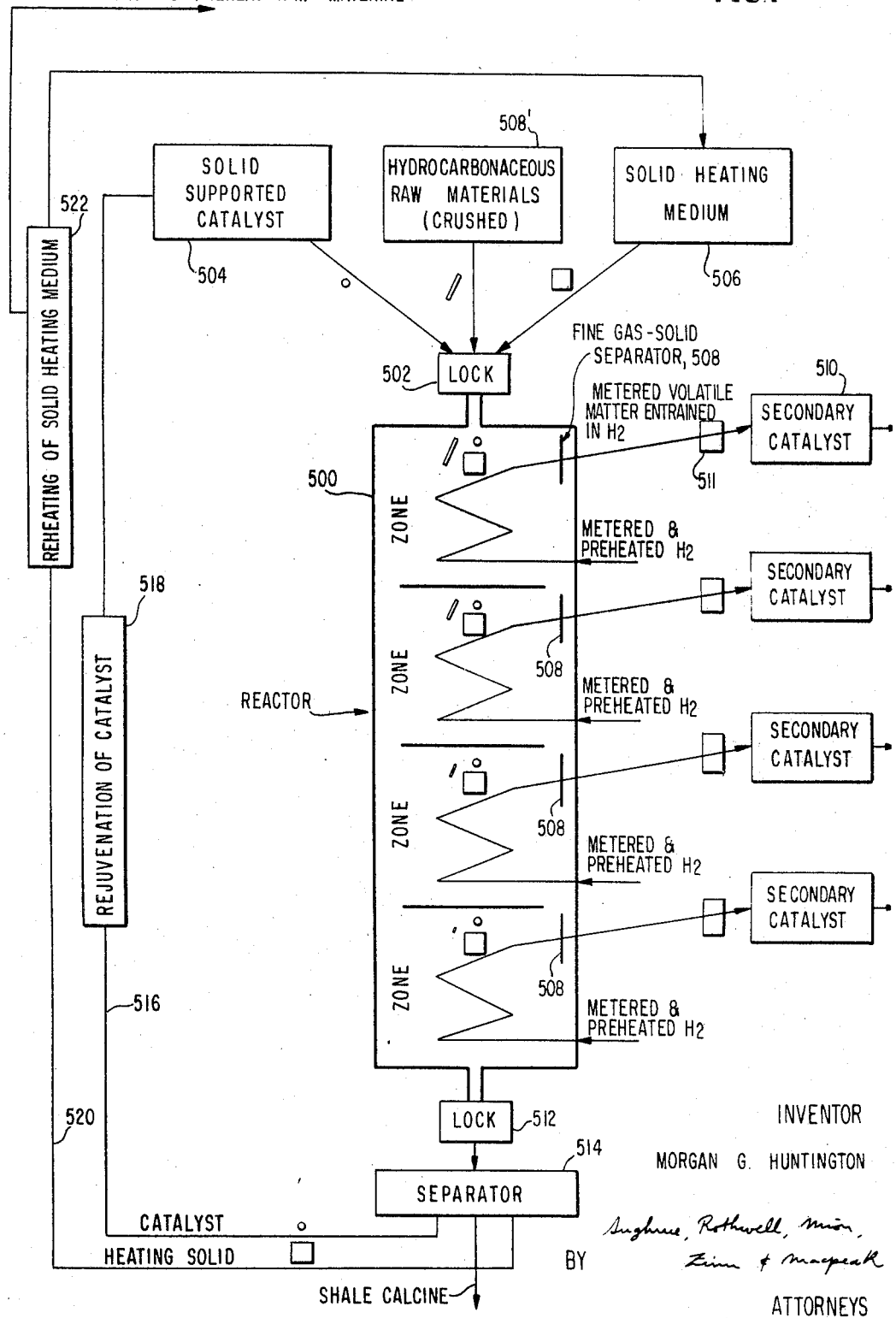

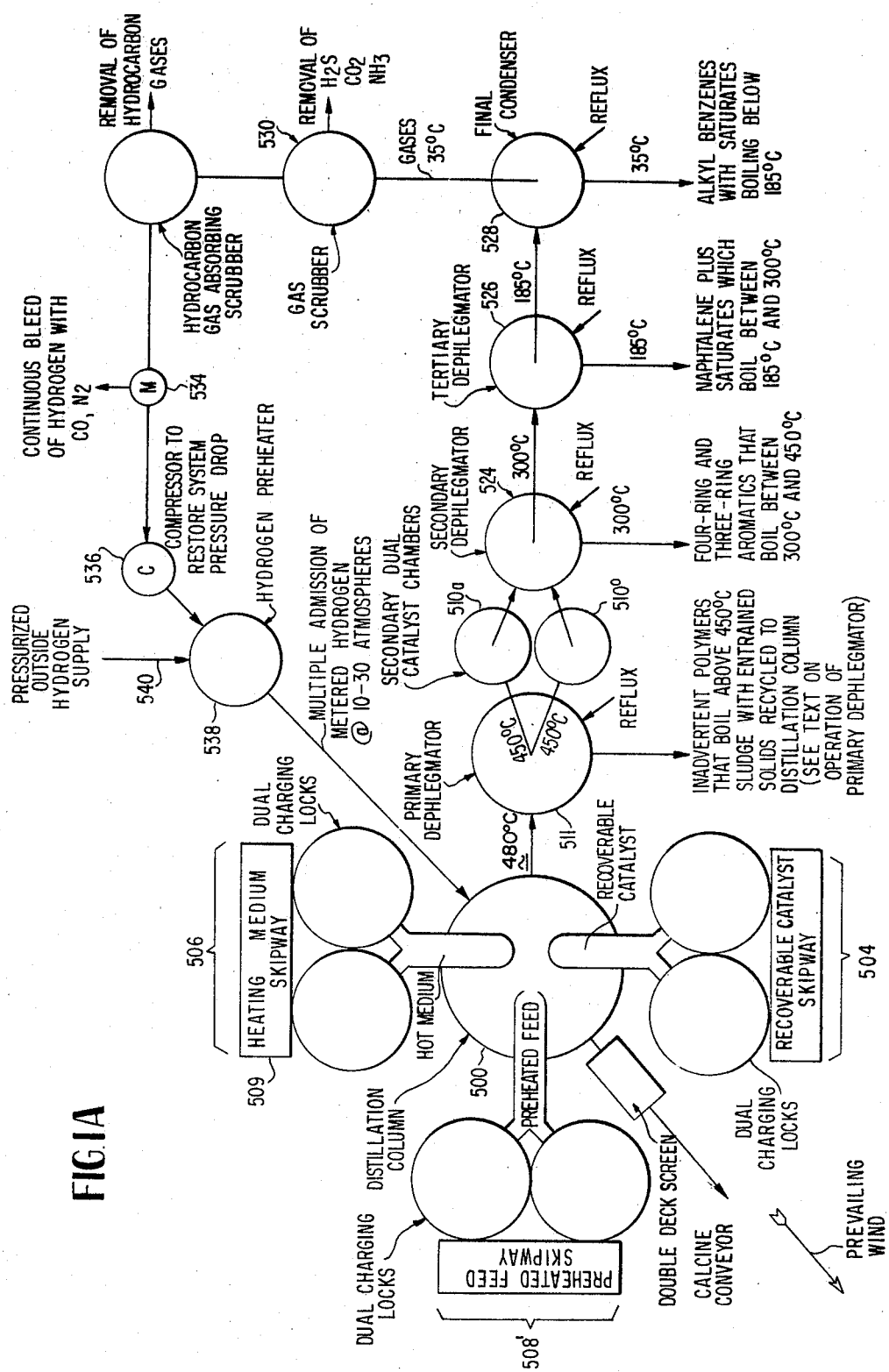

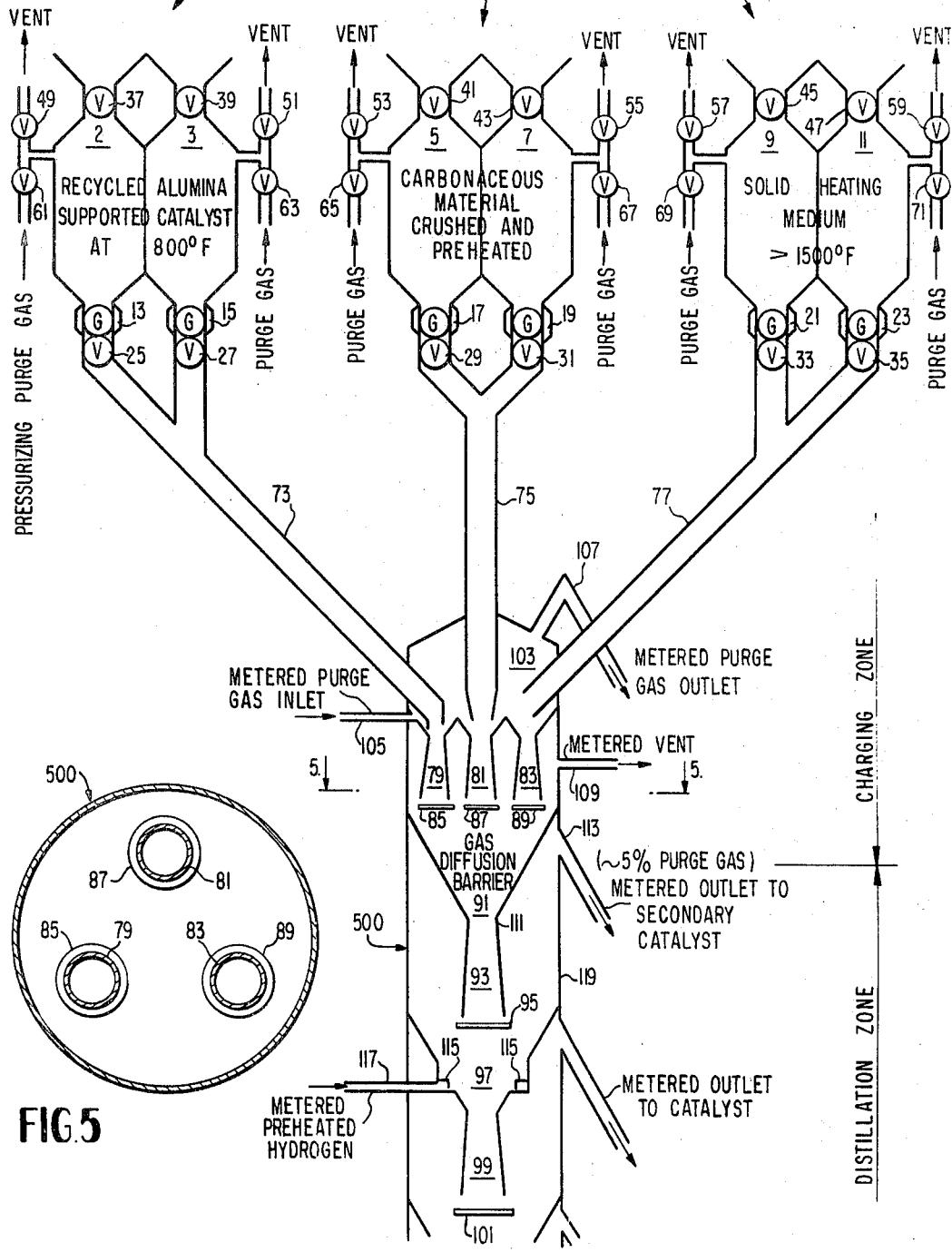

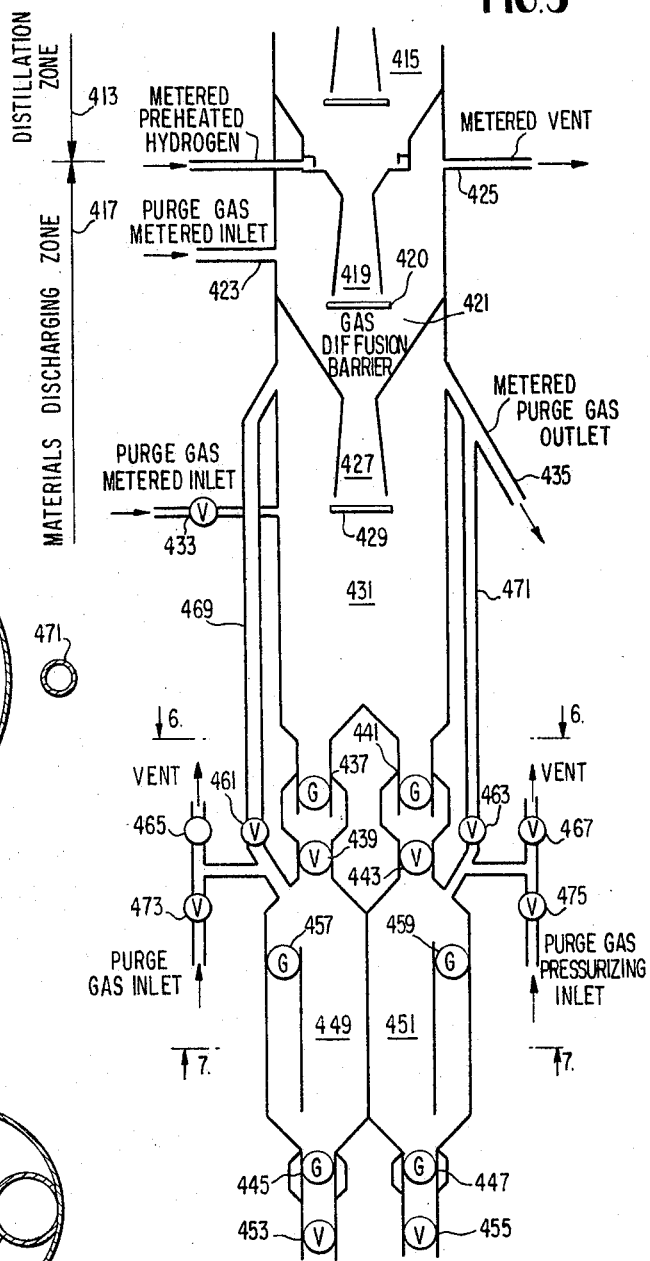

3,475,317
METHOD AND APPARATUS FOR DESTRUCTIVE DISTILLATION OF SOLID HYDROCARBONACEOUS MATERIALS INCLUDING REACTIONS BETWEEN GASES AND UNSIZED SOLIDS AND THE PHYSICAL SEPARATION THEREOF
Morgan G. Huntington, P.O. Box 81,
Galesville, Md. 20765
Filed Dec. 10, 1965, Ser. No. 513,017
Int. Cl. C10b 53/06; C10g 23/06, 37/06
U.S. Cl. 208—10                          17 Claims

ABSTRACT OF THE DISCLOSURE

A method and apparatus for the destructive distillation of hydrocarbonaceous materials is disclosed. The apparatus and process include a means for feeding at least a solid supported catalyst and a crushed hydrocarbonaceous raw material through a lock and to a vertical reactor capable of withstanding temperatures of up to 2000° F. and pressures to 30 atmospheres. The reactor contains a plurality of adjacent vertically positioned distillation zones, gaseous intake and offtake means for each zone, means for providing a gaseous diffusion barrier between zones, and a combination A.C. agglomerator and widening gaseous paths in each zone in front of the offtake means. The reactor is further provided with a second lock means to allow for the removal of the solid material which is subsequently passed to a system which separates effluent solids. Preheated hydrogen is fed into each zone, entrains the destructively distilled and stabilized product and is passed through a plurality of dephlegmators and catalyst beds. The catalyst in the reactor may be rejuvenated and recycled to the original feed means and a solid heating medium may be utilized in the reactor and continuously recycled.

---

This invention relates to a method of contacting gases and broken solids, part or all of which may be finely pulverulent and particularly relates to the separation of entrained solids by settlement against a rising stream of gases. This invention also relates to the improvement of settlement by increasing the mass of individual teetering particles through impinging the finer dispersoids thereupon by electrical means.

This invention also relates to method and apparatus for the step-wise exchanging of heat between two or more mixed classes of formed or broken solids, part of which may be finely pulverulent, wherein a gas consisting mainly of hydrogen performs the essential function of intermediate heat transfer agent.

This invention further relates to the extraction of vapors and gases destructively distilled from pulverulent gangue by entrainment within and displacement by a wash gas which consists chiefly of hydrogen.

It is a particular relation of this invention that, to obtain maximum ultimate yield of the more valuable hydrocarbons, the primary vapors destructively distilled from hydrocarbonaceous substances are brought into contact with a hydrogenation and stabilizing catalyst at the earliest possible instant. It is a further feature of this invention that such early vapor phase catalysis is achieved through the means of admixing physically separable and recoverable catalyst pellets with the hydrocarbonaceous material undergoing destructive distillation.

This invention also relates to the sequential contacting of descending columns of solids by different gases whereby, for example, a combustible gas may be exchanged for a noncombustible gas and whereby the mixing of the exchanging atmospheres can be controllably minimized.

The distillation apparatus of the subject invention is essentially a solid-gas-solid contactor of columnar configuration. Two or more physically separable solids may be charged at the top of the column treated in a hydrogen atmosphere and removed at the bottom under non-explosive conditions, after exchanging hydrogen for flue gas, for example. During the controlled movement of the solids from top to bottom, the solids are alternately held in position for optimum solid-gas-solid contact and alternately dropped through streams of gas to achieve optimum gas-solid contact and entrainment of evolving vapors. Also, during passage through the columnar system, two or more different types of gases may contact the moving solids while mixing of the different atmospheres is minimized.

The column may be operated through a wide range of pressures from sub-atmospheric to a high positive pressure.

The addition of heat to, or the removal of heat from, a mass of unsized, finely divided broken solids is a difficult and time-consuming operation, especially in cases where a substantial portion of the solid material is finer than 50 microns and which will therefore pass a 300-mesh sieve. Moreover, the mechanical problem of heating and/or cooling is further complicated when the process also requires that the finely divided solids be intimately contacted by a large volume of gas and further, that the gas be continuously introduced and removed from the system without substantial entrainment of the solid material. The rapid heat transfer and/or chemical reaction between two or more types of unsized solids, parts of which may be finely pulverulent, and particularly, to perform this heat exchange within a moving gas stream, presents a number of complex mechanical problems which have not heretofore been satisfactorily solved to the extent of permitting commercialization of such a process.

It is therefore, an objective of this invention to effect heat transfer and/or chemical reactions between two or more classes of unsized solids and to facilitate the admixing of large volumes of gas intermittently therewith, without serious entrainment of the finely divided parts of the solid phase as the gas stream and the solid materials are separately and continuously introduced and removed from the system.

Further, when the reacting gas of the subject invention is combustible, as is hydrogen for example, the mechanical difficulties of charging and discharging solids are rendered even more complex by the hazard of explosion unless the mixing of atmospheric oxygen can be absolutely prevented. The avoidance of an explosive mixture of gases is especially difficult during the charging and discharging of hot solid materials, particularly when the system operates at a pressure other than atmospheric.

Therefore, it is also an important object of this invention to provide the means of insuring against the explosive mixing of gases, while permitting the free charging and discharging of fluids and solids while operating a reacting vessel within which gas-solid and solid-solid heat exchanges are performed and wherein gas-solid and gas-vapor chemical reactions may occur.

When destructively distilling hydrocarbonaceous solids, it has been noted that strongly exothermic reactions occur between 700° F. and 900° F., which encompasses the temperature range within which all condensable liquids are distilled. The evolution of 60 to 80 B.t.u. per pound of coal, for example, is attributed to the formation of the typical coke polymer and to other intermolecular reactions which produce high boiling compounds. In order to maximize the yield of liquid distillate from oil shale and from other hydrocarbonaceous material, it has been found advantageous to entrain the volatiles in hydrogen and at the earliest possible instant, to bring the pregnant stream into contact with a stabilizing catalytic surface.

It is therefore a particular object of this invention to admix physically separable and recoverable stabilizing catalyst pellets with the charged material. Ideally, in the case of oil shale, finely powdered shale would thinly surround relatively large pellets of a physically separable catalyst. The catalyst pellets would preferably have a substantially greater heat capacity per unit area as compared to the crushed shale particles and, therefore, the catalyst surface would rise in temperature more slowly than the shale particles. As the hydrogen atmosphere rises in temperature to effect the destructive distillation of the oil shale, ideally, all of the initial vapors would instantly contact the hydrogen-adsorbed catalytic surfaces of the admixed pellets, whereupon all olefinic double bonds would be promptly saturated and all oxygen would be removed from organic combination. As the result of such early catalytic stabilizing contact. very little liquid phase would result from vapor phase polymerization to carbonize within the shale gangue particles. Also ideally, the flowing hydrogen would rapidly carry the catalytically stabilized vapors away from the hot calcine for immediately quenching to a temperature somewhat below the maximum temperature of destructive distillation.

Certain hydrocarbonaceous solids, such as bituminous coals which have an oxygen content below 12%, actually melt and, if left undisturbed, will tend to cake during destructive distillation. However, if the normally caking coal is mixed with a physically separable hydrogenating catalyst in a hydrogen atmosphere the formation of the secondary coke polymer is largely avoided and if the entire mixture is kept in motion so that the juxtaposition of particles is continuously changing, practically no caking will result.

It is, therefore, an additional object of this invention to produce an essentially non-agglomerated char by the catalytic hydrodistillation of bituminous coals which would otherwise be classified as caking.

It must be pointed out that there are three time-dependent limiting factors which govern the throughput rate capacity of the system when destructively distilling any hydrocarbonaceous solid. The first limiting factor is the rate at which gas entrained vapors can be separated from finely divided solid matter; the second rate limiting factor is the time required for heat to be transferred from the solid heating medium to the raw material in order to raise the temperature of the latter to effect destructive distillation; the third time-dependent factor is the rate at which the raw material is impoverished of its volatile matter after having reached the temperature of destructive distillation.

In summary, the principal objects of this invention are:

(a) To limit superficial gas velocities within the conico-cylindrical gas-solid separation zone to, say, one-half foot per second at the section of its least horizontal area, and to cause the teetering solids to agminate and grow in size by electrical means.

(b) To provide optimum solid-gas-solid contact in hydrogen so that the raw material can be brought to the desired temperature quickly by transfer of heat from the admixed heat source.

(c) To provide adequate residence time of the raw material to effect the practically complete evolution of volatiles while effecting step-wise evolution of volatile matter from the calcining mass by entrainment in a wash gas.

(d) To mix with the solid hydrocarbonaceous materials during distillation a recoverable catalyst having a greater heat capacity per unit surface area than the solid hydrocarbonaceous materials and to screen out and recycle the catalyst after destructive distillation is completed.

(e) To minimize carbonization upon a secondary catalyst by removing high boiling compounds, mist and small solids and to adjust temperature of the gas-entrained vapors by dephlegmation prior to secondary catalysis.

Other objects of the invention will be pointed out in the following description and claims and illustrated in the accompanying drawings which disclose, by way of example, the principle of the invention and the best mode which has been contemplated of applying that principle.

In the drawings:

FIGURES 1 and 1A constitute general flow sheet diagrams of a process to which, for example, the method and apparatus of the invention are applicable;

FIGURE 2 is a schematic vertical section of the materials charging zone of gas-solid-solid contactor column;

FIGURE 3 is a schematic vertical section of the materials discharging zone of the gas-solid-solid contactor column;

FIGURE 5 is a schematic horizontal section taken on 5—5 of FIGURE 2 of the contactor column;

FIGURE 6 is a schematic horizontal section taken on 6—6 of FIGURE 3 of the contactor column; and FIGURE 7 is a schematic horizontal section taken on 7—7 of FIGURE 3 of the contactor materials discharge bins showing the over-fill safety feature.

Figure 4:
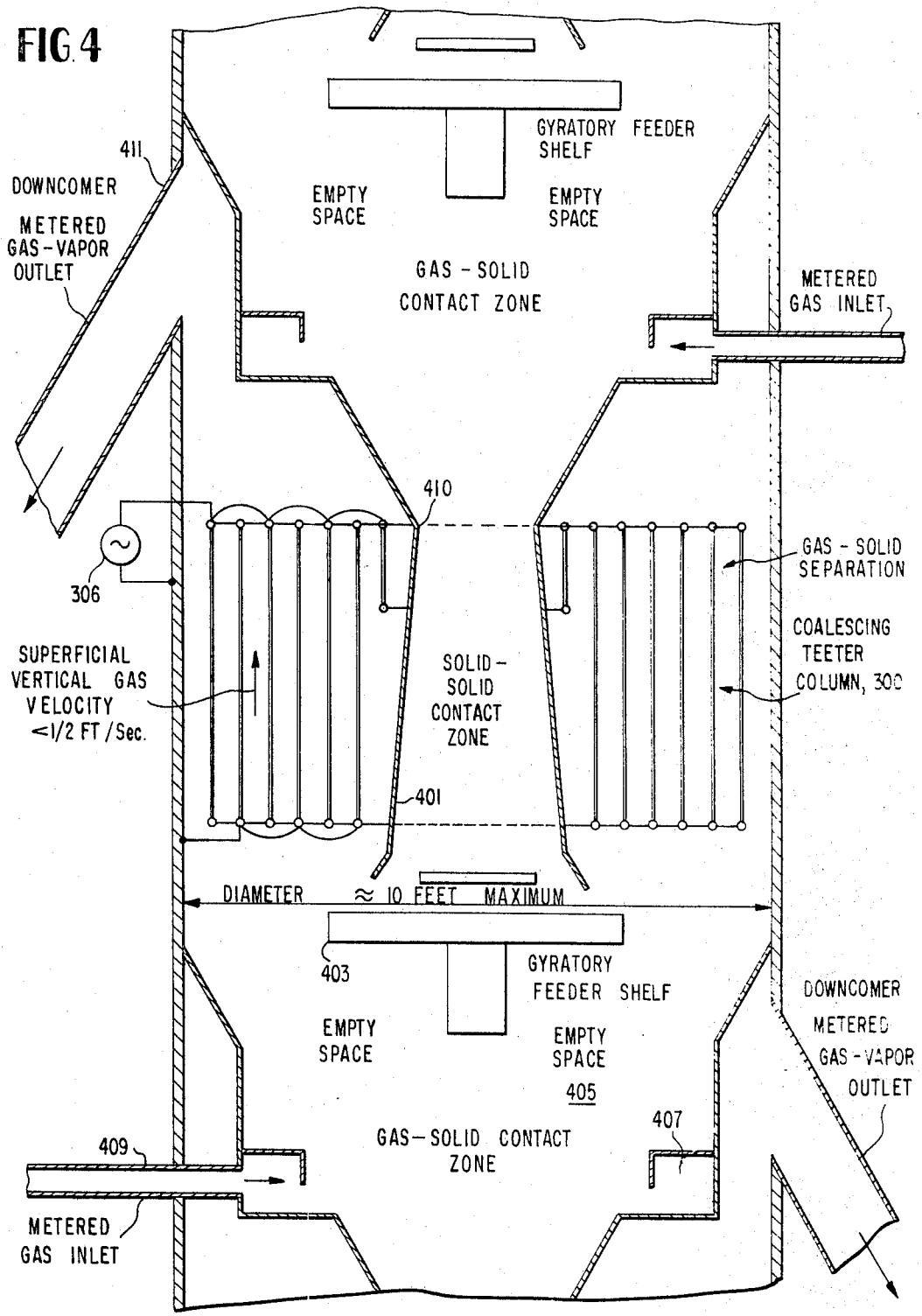
FIGURE 4 is a schematic vertical section of a typical columnar unit of the distillation zone of the gas-solid-solid contactor.

The method and apparatus of this invention are applicable to the destructive distillation of coal, lignite, oil shale and other carbonaceous solids such as complex mixtures of municipal and industrial wastes. When used in conjunction with hydrogenating catalysts in a hydrogen atmosphere described herebelow, light, stable hydrocarbons constitute the entire distillate of the system.

The following description is given by way of example of the distillation of Rocky Mountain oil shale for the direct production of light, stable hydrocarbons, nearly all of which fall within the temperature range of gasoline.

In the present example of extracting light, stable hydrocarbons from Rocky Mountain oil shale by direct, single step destructive distillation in the apparatus of the subject invention, it is necessary to consider these thermal, chemical and physical factors:

(A) The heating and the pyrolysis of oil shale (1) The destructive distillation of oil shale (when finely crushed) is completed in 60 minutes when heated to 797° F. When heated to 842° F., the evolution of volatiles is substantially complete within 20 minutes. Reference: United States Bureau of Mine Report of Investigations 4744 of 1950.

(2) The net thermal input requirement to effect destructive distillation of oil shale is about 300 B.t.u. per pound, including drying. (In the process of the subject invention, about half of the total thermal requirement is met by preheating and the balance is transferred from a solid heating medium within the reactor vessel as system pressure.)

(3) Shale must be preheated in a non-oxidizing atmosphere in order to prevent distillate loss by oxidation. Reference: United States Bureau of Mines Report of Investigations 6166 of 1963.

(4) Shale cannot be preheated without loss much above 400° F., because the evolution of volatiles begins slowly at about that temperature. Reference: Page 14, Battelle Memorial Institute Report of Thermogravimetric Analysis, Aug. 12, 1965.

(5) When heated above 1000° F., oil shale calcine begins to absorb heat and evolve $CO_2$ from carbonate destruction.

(B) Chemical considerations (1) In order to maximize the yield and to minimize the formation of the usual secondary coke polymer, a hydrogenating catalyst pellet must be mixed with the crushed shale. For obvious economic reasons, the catalyst pellets must be of such size as to be physically separable and recoverable from the shale calcine. To further stabilize the primary volatile matter, the hydrogen entrained vapors must be promptly led through a sufficient bed of catalyst in order to saturate olefinic double bonds and to remove oxygen, sulfur and nitrogen from organic combination.

In order to minimize carbonization and other deposits upon the secondary catalyst surface, the hydrogen entrained vapors must be maintained in the vapor phase and mist and dust must be first removed.

(2) Some three to eight moles of gaseous hydrogen per mole of condensable volatile matter must be introduced into the reaction zones during the destructive distillation of the oil shale. During primary and secondary catalysis, from five to fifteen per cent of the hydrogen introduced is consumed as chemical reactants in removing oxygen, nitrogen and sulphur from organic combination and in saturating olefins.

(C) Physical considerations (1) In the process of the subject invention, Rocky Mountain oil shale is nearly completely impoverished of the cementing organic matter and the calcine is, therefore, substantially pulverulent, much of it being finer than 325-mesh or about 50 microns. The settling rate of 50 micron particles of shale calcine is somewhat less than one-half foot a second under system conditions. For this reason, electric agminating by impingement upon larger teetering particles is an essential part of the process.

(2) When treating oil shale yielding ten weight percent of volatile matter, and introducing some three moles of hydrogen per mole of volatiles, the total standard volume is about 5,000 cubic feet per ton of oil shale. At system temperature and pressure of, say, 850° F., and 300 p.s.i.a., the actual volume of gas entrained vapors becomes about 750 cubic feet per ton of oil shale charged. This volume of gaseous material must be continuously removed from the descending column of increasingly pulverulent gangue without serious entrainment of solids.

The general flow diagram can be explained with reference to FIGURES 1 and 1A wherein reactor 500 of this invention is shown schematically being fed from three sources of different materials through lock 502 to be described hereinafter. There is a source of solid supported catalyst 504 which may be cobalt molybdate supported on alumina pellets, a solid heating medium 506 which is a different size from the catalyst pellets in order to allow separation by screening therefrom and may be any suitable material which is resistant to thermal shock and capable of being rapidly heated and cooled, and a feed of the hydrocarbonaceous materials 508 which may, in the described example, be crushed and preheated oil shale. Each different material source includes dual charging bins and locks shown in more detail in FIGURE 2 and may be skip fed by skip hoists 509. The materials are fed together into the reactor 500 and passed through a plurality of zones as indicated and as will be described in more detail hereinafter. Into each zone there is admitted metered and preheated hydrogen which is heated at least to the temperature of the system to furnish a hydrogen environment for the destructive distillation accomplished by the solid heating medium. As the volatile matter of the hydrocarbonaceous materials is evolved during the destructive distillation, it is entrained in the hydrogen and is metered out an offtake from each zone. Ahead of each offtake and within the column proper, there is provided an electric gas-fine solid separator means 508 for each zone, illustrated in more detail in FIGURE 4. The volatile matter entrained in hydrogen may be passed to a secondary catalyst chamber 510, after first passing through a primary dephlegmator 511 to remove entrained solids from the stream while also removing high boiling point mist. The spent calcine from the hydrocarbonaceous material of oil shale, the catalyst pellets and solid heating medium pass through a lock 512 at the bottom of the reactor through a separator 514 which may be a screening type separator which discards the calcine and separates the solid supported catalyst from the heating solid medium. The catalyst may then be recycled through recycle line 516, may be rejuvenated and cooled as desired by conventional rejuvenation means 518 and recycled to feed chamber 504. For reasons noted earlier, the catalyst has greater heat capacity per unit of surface area than does the oil shale. Preferably the catalyst is introduced into the reactor at a temperature 100° F. below that of the shale and picks up heat principally from the exothermic hydrogenating reactions effected upon its surface. The heating solids are also recycled along line 520, may be reheated as desired by heating means 522 and fed into the solid heating bin 506.

The polymers which boil above, say 450° C. entrained with whatever dust that escapes the electrostatic dust separator means 508 are recycled from the primary dephlegmator 511 to the reactor 500. However part of this cooled liquid may be used for reflux in the primary dephlegmator. The 450° C. vapors and gaseous compounds relatively free of mist and dust, are passed to secondary dual catalyst chambers 510 and 510a used alternatively. The catalytically hydrogen-stabilized product may then be led to a secondary dephlegmator 524 for condensation and removal of four ring and three ring aromatics plus saturates that boil between 300° C. and 450° C. The 300° C. vapors may then be further cooled in a teritary reflux dephlegmator 526 from which naphthalene plus saturates which boil between 185° C. and 300° C. may be removed. A final condenser 528 may follow the teritiary dephlegmator 526 and from it alkylbenzenes with saturates boiling below 185° C. may be removed. The uncondensed gases pass to a gas scrubber 530 for removal of $H_2S$, $CO_2$ and $NH_3$ and then to ahydrocarbon gas absorbing scrubber 532 for removal of hydrocarbon gases. Some hydrogen, with nitrogen, with nitrogen and carbon monoxide, are continuously bled off metered outlet 534 and the remaining gases, principally hydrogen, are raised in pressure by a compressor 536 and pumped into ahydrogen preheater 538. This preheater also receives an outside supply of hydrogen 540. Preheated hydrogen is then admitted to reactor 500 at multiple levels and in metered amounts as shown in FIGURE 1.

The internal operation of the reactor including the various locks, the gas-fine solid separating means and other features are described with reference to the remaining figures of the drawings.

Referring to FIGURES 2–7 for further description of the apparatus for practicing this invention, there is shown in FIGURE 2 a dual catalyst bin 2 and 3, a dual raw materials bin 5 and 7 and a dual bin 9 and 11 for a solid heating medium. Catalysts bins 2 and 3 include undercutting arc gates 13 and 15. Similarly, feed material bins 5 and 7 include undercutting arc gates 17 and 19 and solid heating medium bins 9 and 11 include undercutting arc gates 21 and 23. Additional gas-tight bottom valves are provided below the undercutting arc valves in each of the lines from each of the bins as indicated at 25, 27, 29, 31, 33 and 35 of FIGURE 2.

Suitable skip feeding or other feeding means for charging the bins may be provided and the tops of each bin are provided with gas-tight top valves as shown in FIGURE 2 at 37, 39, 41, 43, 45 and 47. In addition, each bin includes a passage with valves for venting, these valves being valves 49, 51, 53, 55, 57 and 59 as well as valved lines leading into each bin for pressurizing the bin with purge gas, namely valves 61, 63, 65, 67, 69 and 71.

Gas-tight chutes 73, 75 and 77 are provided for the catalyst, for the hydrocarbonaceous feed materials and for the solid heating medium, and these chutes discharge into feeder columns 79, 81 and 83, respectively. However, the chutes 73, 75 and 77 are gas-tight in respect to the gas diffusion dome 103 and their respective source bins, but they are physically separated from the tops of feeder columns 79, 81 and 83. Each of these feeder columns has a gyratory feeder shelf 85, 87 and 89 or other suitable means to control the discharge out of the feeder tube adjacent the bottom thereof.

A gas diffusion barrier zone 91 including gas sampling vent 109, is below the feeder columns and leads into an initial solid-solid contact zone feeder column 93 which has a gyratory shelf 95 or other suitable materials flow controller at the bottom end thereof. Below feeder tube 93 is the first gas-solid contact zone 97 and yet below is a second solid-solid contact zone of feeder tube 99 which has a second gyratory shelf or flow controller 101 at the bottom thereof. Such typical units of the distillation zone are repeated as the throughput capacity of the system requires.

A gas diffusion dome 103 is at the top of the reactor and includes a metered purge gas inlet 105 and a metered purge gas outlet 107. The solid-solid contact column 93 includes a constricting throat 111 and above the level of the constricting throat is a first vapor stream off-take which may be metered. An annular hydrogen admission ring 115 is provided in the reactant gas-solid contact zone 97 for admitting metered hydrogen which may be preheated to the system temperature, but which may or may not contribute to the net system heat input. Connected to the annular hydrogen ring 115 is a metered hydrogen inlet 117. The walls 119 of reactor 500 may be suitably insulated and capable of carrying requisite pressure.

There may be a plurality of similar distillation zones as shown in FIGURE 2 near the lower end thereof, and FIGURE 4 illustrates one of these zones in more detail. Referring to FIGURE 4, there is shown a solid-solid contact tube 401 and a gyratory feeder shelf 403 adjacent the bottom thereof to control the feeding of solids out of solid-solid contact zone defined by the interior of the tube 401. There is a reaction zone defined by empty space 405 below the shelf 403 and an annular hydrogen admission ring 407 connected to the metered hydrogen inlet 409. One or more metered gas vapor off-takes 411 are provided at the upper end of the gas-solid separating teeter column 300. The distillation unit illustrated in FIGURE 4 is identical with the other typical distillation units comprising the distillation sections of the reactor 500 and they all may include the unique means for gas-solid separation including a coalescing teeter column indication generally at 300 and defined between the outside of the solid-solid contactor tube 401 and the inside of the insulated pressure walls 119. Because of the inwall batter of tube 401, the horizontal cross-sectional area of the gas solid separating chamber is smaller at the bottom than at the top, and thus forms a selective teeter column of suspended solid particles which are in equilibrium with the superficial velocity of the rising gas and, therefore, are "in teeter." Within the teeter column the larger particles collect the finer solid materials by electrical impingement which would otherwise be carried out of the apparatus by the flow of gas to the off-take 411. With oil shale calcine, the separation of these fines from the gas stream is a particular problem. This invention provides several annular capacitor assemblies of low electrical resistance and fairly high capacitance consisting of vertical conductors spaced from one to four inches apart by conducting rings on top and bottom of the assemblies. Each assembly of spaced conductors is connected to an alternating current source and functions electrically as a capacitor. However, because of the collapsing and building electric fields afforded about the conductors, fine particles in suspension are effectively coalesced and impinged upon the larger particles in teeter. The AC supplied by source 306 to the conductor plates, wires or tubes of the condenser assembly will cause the solids to coalesce upon teetering grains, thereby increasing their masses and, therefore, their terminal velocities, causing the enlarged particles to settle from the gas-solid separating column.

The lower limit of distillation zone 413 is shown in FIGURE 3 with a materials discharge zone 417 therebeneath. This zone includes a gas diffusion barrier tube 419 opening into a gas diffusion chamber 421 through a solids material feeder 420. The chamber is provided with a purge gas metered inlet 423 and a metered vent 425. A lower gas diffusion barrier tube 427 is provided at the lower end of chamber 421 and the solids feeder means 426 are at the lower end of tube 427 leading into a discharge surge bin 431. There is a purge gas inlet 433 to the discharge surge bin and a metered purge gas outlet 435 from the surge bin. The surge bin has dual outlets each provided with undercutting gate 437 followed with a gas-tight discharge valve 439 in the left gate and undercutting gate 441 in discharge valve 443 in the right gate. Below these gates are calcine discharge pockets 449 and 451 of their respective bins which empty out through arc cutting discharge gates 445 and 447 followed by gas-tight discharge valves 453 and 455. Overfille safety pockets are controlled by providing at their top drop gate valves 457 and 459. Each chamber includes a purge gas by-pass line with valves 461 and 463. Purge gas vents are controlled by valves 465 and 467 while purge gas inlets are controlled by 473 and 475. Purge gas by-pass ducts 469 and 471 lead from the pockets 449 and 451 to the materials discharging zone 431.

FIGURE 2 schematically shows a vertical section of the three pairs of materials charging bins and the upper part of the gas-solid-solid contactor and is used for reference in the following description and example of the process when treating Rocky Mountain oil shale.

With all gates 13, 15, 17, 19, 21, 23 and lower valves 25, 27, 29, 31, 33 and 35 closed, fill one of the dual left hand bins 2 with, say, ¼-inch catalyst pellets at about 800° F. Fill one of the center dual bins 5 with oil shale which is preferably preheated above 400° F. and crushed so that one dimension of the largest fragment is less than, say, ¹⁄₁₆-inch. Also fill one of the right hand dual bins 9 with a heating medium, such as ¾-inch alumina spheres which have been heated to, say, 1600° F.

Close the upper gas-tight valves 37, 41, 45 and close vent valves 49, 53, 57. Admit preheated purge gas by opening valves 61, 65, 69 to pressurize each of the filled bins to system pressure with purge gas from high pressure purge gas main (not shown), say, to 300 p.s.i., which would be equal to the pressure within the gas-solid-solid contactor column 2, and proceed to fill the second of each of the dual bins 3, 7, 11, to be likewise subsequently pressurized.

Open valves 25, 29, 33 and then open undercutting arc gates 13, 17, 21, to permit the three types of solids to fill ducts 73, 75, 77, and feeder columns 79, 81, 83.

Superheating of the preheated shale to the temperature of destructive distillation is begun by causing the gyratory feeder shelves (my prior issued Patent No. 3,083,471) to gyrate at such speed and amplitude that the three solids are fed in the desired proportion into the solid-solid contact column 93.

It should be noted that the materials chutes 73, 75, 77, terminate a short distance above the top of their respective feeder columns 79, 81, 83. Therefore, direct gas flow by differential pressure from the materials chutes to the diffusion barrier zone 91 is interrupted and any gas which is forced to move either up or down must approach the average analysis of the gas within the diffusion dome 103.

Even though the gas diffusion potential of the reacting gas may be proportionately high, which in this example is hydrogen, its partial pressure can be maintained at a desirably low figure, either by holding the purge gas pressure in the charging bins somewhat above the contactor column 1 pressure, or by admitting purge gas through inlet 105 and, in both cases, metering the diffusion gas out through purge gas outlet 107.

Because the diffusion potential of hydrogen is much greater than that of the purge gas, the two gases cannot be kept from mixing to some degree. Therefore, the separate chamber or "diffusion barrier" 91 is provided between the purge gas section above the hydrogen section below so that neither pure hydrogen can diffuse upwardly nor pure purge gas be forced downwardly. The analysis of the gases within the diffusion barrier zone is checked at metered vent 109 and the hydrogen content is kept well below equilibrium by adjusting the over pressure in diffusion zone 103.

As a further resistance to hydrogen diffusion upward into the diffusion barrier, the solid-solid contact column is maintained full of mixed solid material, well above its constricting throat 111, by its feeder shelf reacting to a density sensing device (not shown). Furthermore, hydrogen diffusion upward is further impeded by the downward movement of the mixed solids within the solid-solid contact column 93, which is quite rapid.

The purpose of the gas diffusion barrier zone 91 and the gas diffusion dome 103, the pressurization and continuous purging of the materials charging section is to effectively eliminate any reasonable likelihood that an explosive mixture of air and hydrogen could form.

As a further means of limiting the diffusion of hydrogen upward through the solid-solid contact column 93, the analysis of gas leaving with the initial vapor stream metered off-take 113 is kept to, say, five volume percent of purge gas by maintaining a sufficient over pressure in the gas diffusion dome 103 and in the charging section above.

Mixed solids in the desired proportion, having been fed proportionately from feeder tubes 79, 81, 83, leave the first solid-solid contact column 93 over the periphery of gyratory materials control shelf 95. As the solid cascade falls through the empty gas-solid contact zone 97 and radially outboard of annular hydrogen admission ring 115, it must slide across and over the continuously admitted annular stream of hydrogen, entering by metered inlet 117, insuring fairly uniform, though momentary, gas-solid contact.

The volume of preheated hydrogen admitted through inlet 117 and taken off through metered offtake 113 is primarily limited by the allowable vertical superficial gas velocity in the annular space between the solid-solid contact tube 93 and the major contactor pressure walls 119. Furthermore, the time of contact (through hydrogen) between the hot solid medium and the raw material has, so far, been short and only a small portion of the latter can have been heated to distillation temperature. Therefore, only a fraction of the total hydrogen requirement need be met in this initial stage or in any one subsequent stage of progressive distillation.

Following the initial gas-solid contact between the progressively heating raw material in empty space 97, the various solids again gather into intimate contact as they enter solid-solid contact tube 97, to be controllably discharged once more into the succeeding gas-solid contact space below.

For a more detailed description, please refer to FIGURE 4, which is a typical unit of the repetitive stepwise heating, distillation and primary contact catalysis section of the total composite gas-solid-solid contactor column. As has been briefly explained above, the distillation section of the gas-solid-solid contactor columnar assembly is comprised of a series of these identical units which accomplish in a stepwise fashion, the heating of the raw material to distillation temperature by solid-solid contact with a solid heating medium, both of which are in an atmosphere which is chiefly hydrogen during each downward passage through typical tube 401. Of course, the relatively high thermal conductivity of gaseous hydrogen greatly speeds and assists the solid to solid heat transfer function.

The residence time requirement for heating the shale to distillation temperature and for complete evolution of volatile matter is met by providing a sufficient number of sequential, typical solid-solid contact tubes 401.

As the mixture of the solid materials, which in this example consists of alumina-supported catalyst pellets, crushed oil shale and hot alumina spheres, is metered from typical solid-solid contactor tube 401 over the rim of typical gyratory metering shelf 403, the mixture of solids drops through hydrogen in typical empty space 405 to land radially outboard of the typical annular hydrogen admission ring 407. Hydrogen admitted through typical annular ring 407 from typical metered inlet 409 flows upward through the solid mixture, momentarily entraining the finer fragments and insuring intimate gas-solid contact.

The throughput capacity of the system is limited by three time-dependent factors; the first is the rate at which hydrogen-entrained vapors can be withdrawn through metered gas outlet 411 to secondary catalysis, relatively free of entrained solids. The second is the rate at which heat can be transferred from the heating medium to the crushed oil shale and the third time-dependent factor is the rate of volatile matter evolution after the shale has reached its distillation temperature.

The mechanics of separating fine solids from the hydrogen-entrained vapor is obviously of paramount importance to the successful and continuous operation of the system. The approximate settling rate of 50-micron oil shale particles in hydrogen at system temperature and pressure, say 800° F. and 300 p.s.i.a., is about one-half foot per second. A substantial part of oil shale calcine produced by this process invention is finer than fifty microns. Furthermore, about one-half foot a second is the minimum practical superficial gas velocity within the distillation column of the subject invention if a commercial rate of distillation is to be obtained. Therefore, it becomes necessary to cause the finely entrained shale particles to agminate and so to increase their settling rates beyond the superficial gas velocity.

In the subject invention, referring again to FIGURE 4 and particularly to the gas-solid separation zone, metal wires, narrow plates or tubes are hung from concentric rings electrically insulated from the containing vessel, spaced, say, from one to four inches both radially and circumferentially, depending upon the size and type of service and the degree of gas cleanliness desired. The assembly has appreciable capacitance and low resistance and its electrical characteristics are similar to those of a conventional condenser. When connected to an alternating current source, the collapsing and building of the electric field, and its rapidly changing sign, causes suspended particulate matter to agminate into larger particles of higher settling rates than the initial dispersoids. (Please refer to my issued Patent No. 3,100,146 which discloses the electrical coalescing of ultra minute particles into larger, filterable sized particles.) In the process of this subject invention, the fine particulate matter is not collected upon any fixed electrode, but rather is caused to impinge upon larger particles in equilibrium in the rising gas stream, which are in "teeter."

Thus, the teetering particles are continuously caused to grow in size and progressively move downward to a lesser horizontal area and to a region of higher gas velocity, until they finally grow sufficiently large to fall below the level of the gyratory feeder shelf 403.

The principle of electrically causing very finely divided gas-entrained particulate dispersoids to coalesce without precipitation upon a collecting, fixed electrode is disclosed in my Patent No. 3,100,146. This invention differs from my earlier disclosure in that the teeter grains of dust, which are in equilibrium with a rising gas stream which decreases in superficial velocity from bottom to top of the containing vessel, are employed as the autogenous nuclei for particulate agmination.

When the oil shale has been impoverished of volatile matter and the gas stream exhausting through the lowest typical metered gas-vapor outlet 411 has a negligible vapor content, distillation is complete and the calcine, together with the catalyst pellets and the solid heating medium, must be discharged from the system. In order to insure against an explosive condition when discharging hot hydrogen-impregnated solids into the atmosphere, a non-combustible purge gas must be exchanged for hydrogen before atmospheric contact. The exchange of purge gas for hydrogen and the discharge of solids from the pressurized distillation column are accomplished in the following manner:

FIGURE 3 illustrates the lowest distillation unit 415 and the entire gas exchange and solid materials discharge zone 417.

When the solid materials enter gas diffusion barrier 419, the oil shale has been destructively distilled, ending the evolution of combustible volatiles. The interstices and voids within the mixed solids contain hydrogen which is removed by diffusion into the large volume of purge gas occupying the gas diffusion chamber 421. The concentration of hydrogen is maintained at a low level as purge gas is metered into chamber 421 through purge gas inlet 423 and the mixture of hydrogen and purge gas is metered out through vent 425.

The solid material entering the second gas diffusion barrier tube 427 is substantially free of hydrogen, and any remaining hydrogen is diffused away into the purge gas occupying surge bin 431 as the solid material falls over the periphery of gyratory feeder shelf 429. The hydrogen content of the gas mixture in surge bin 431 is also kept below an acceptable level by metering purge gas through inlet 433 and exhausting the gas mixture through metered purge gas outlet 435.

The discharge of solids from the gas-solid-solid contactor column is described in the following operating sequence. Referring again to FIGURE 3, undercutting gate 437 and gas-tight valve 439 are open, while undercutting gate 441 and gas-tight valve 443 remain closed. Also, at the beginning of the calcine discharge operation, undercutting arc gates 445 and 447 and gas-tight valves 453 and 455 remain closed. Drop gates 457 and 459 also remain closed at the beginning of the calcine discharge operation.

As calcine is discharged from surge bin 431 through valves 437, 439 or 441, 443 into the respective bins 449, 451, valves 457 and 459 remain closed, leaving the overfill safety chambers empty. The other chambers 449, 451 are completely full, however, which would normally prevent the closing of valves 439 and 443. Undercutting arc valves 437 and 441, being so designed, are then closed across the column of broken solids. Subsequently, swing type chute gates 457 and 459 are dropped open to fill up the overfill safety and drain out the solid materials which would otherwise block the gas-tight closing of valves 443 and 439. These valves may then be closed to form gas-tight seals and the bottom valves for chambers 449 and 451 may be safely opened to the atmosphere after depressuring through vents 467 and 465.

The three classes of solids, pulverulent oil shale calcine, catalyst pellets and the solid heating medium, by virtue of their size differences, are separated by separator 514 (FIGURE 1) which may be a conventional double deck screen (not shown). The calcine is sent to waste, while the catalyst pellets and heating medium are separately recycled, following their respective suitable rejuvenation and reheating or cooling.

While the invention has been particularly shown and described with reference to a preferred embodiment thereof, it will be understood by those skilled in the art that various changes in form and details may be made therein without departing from the spirit and scope of the invention.

What is claimed is:

1. A method for the destructive distillation of hydrocarbonaceous solids including stabilization en masse of the primary volatile matter, comprising:
   (a) mixing a physically separably solid supported stabilizing catalyst with a mass of particles of the hydrocarbonaceous material,
   (b) heating the mixture to a temperature sufficiently high to cause destruction distillation of the primary volatile matter in the hydrocarbon to begin and proceed, said distillation being effected without the benefit of said catalyst,
   (c) stabilizing the primary volatile matter in the presence of the catalyst and an environment of essentially hydrogen,
   (d) removing the stabilized volatile matter by hydrogen entrainment,
   (e) physically separating all solids from the entrained volatile matter, and
   (f) separating the devolatilized hydrocarbonaceous solid from the solid supported stabilizing catalyst.

2. A process as claimed in claim 1 wherein heating is accomplished by mixing another physically preheated inert solid with the catalyst and hydrocarbonaceous material.

3. A process as claimed in claim 2 comprising separating the heated inert solid from the solid catalyst and the devolatilized material.

4. A process as claimed in claim 1 comprising further catalyzing the removed volatile matter, after partial dephlegmation with a stabilizing catalyst.

5. A process as claimed in claim 1 further comprising recycling the catalyst and rejuvenating and cooling during the recycle when necessary, and providing a catalyst with a greater heat capacity per unit of surface area than the hydrocarbonaceous solids.

6. A process as claimed in claim 1 further comprising preheating the solid hydrocarbonaceous material to just below the temperature of distillation, the preheating being accomplished just before sizing.

7. A process as claimed in claim 1 wherein the hydrocarbonaceous material is oil shale, coal or tar sand.

8. A process as claimed in claim 1 wherein distillation and removal of gas-entrained volatiles are accomplished at a plurality of separate zones.

9. A process as defined in claim 1 wherein the separation of solids is accomplished during the removal by electrical agglomeration of the solids in a teeter column zone.

10. A process as defined in claim 1 further comprising partially condensing the higher boiling point compounds of the removed volatile matter entrained in hydrogen and scrubbing out any entrained solids, and then performing a final stabilizing catalysis on the removed hydrogen-entrained vapor stream.

11. A method for the destructive distillation of hydrocarbonaceous solids comprising:
   (a) controllably feeding hydrocarbonaceous solids through a plurality of sequential vertical distillation zones,
   (b) controllably heating the hydrocarbonaceous solids in the presence of a physically separable catalyst in the distillation zones to distill volatile matter therefrom,
   (c) providing a gaseous environment in the distillation zones consisting chiefly of hydrogen,
   (d) controllably withdrawing the evolved volatile matter entrained in the hydrogen from each distillation zone,
   (e) preventing within each distillation zone the withdrawal of solids with the hydrogen entrained volatile matter by electrically agglomerating any solids carried by the hydrogen entrained volatile matter while flowing upward through a region of widening area in each distillation zone, and
   (f) removing solids from the lowest of the distillation zones.

12. A method as defined in claim 11 further comprising:
   (a) providing the hydrogen environment in the distillation zone under at least 10 atmospheres pressure,
   (b) feeding and withdrawing the solids through non-explosive locking zones, and (c) preheating the hydrocarbonaceous solids prior to their being fed to the distillation zone.

13. A method as defined in claim 11 wherein the electric agglomeration of fine particles upon autogenously supplied nuclei utilizes a high potential alternating current field.

14. A method as defined in claim 11 further comprising condensing high boiling liquid mist and simultaneously scrubbing out any entrained solids from the withdrawn stream of distillate volatile matter and hydrogen, and then finally catalytically stabilizing the uncondensed vapor stream.

15. Apparatus usable for the destructive distillation of hydrocarbonaceous materials comprising:
(a) a vertical reactor capable of withstanding temperatures of up to 1000° F. and pressures to 30 atmospheres,
(b) means to controllably feed three separate and separable solid materials (such as a solid supported, separable catalyst, hydrocarbonaceous raw material, and a solid heating medium) through pressure locks to the reactor,
(c) means within the reactor to define a plurality of adjacent vertically positioned distillation zones each separated by a controllable solid material feed means providing a gaseous diffusion barrier between zones,
(d) gaseous intake and offtake means for each distillation zone within the reactor,
(e) a combination A.C. agglomerator and widening gaseous path in each distillation zone in front of the offtake means for separating gases from fine solids, and
(f) means for removing the solid materials through a pressure lock from the bottom of the reactor.

16. Apparatus as defined in claim 15 wherein the controllable solid feed means separating distillation zones includes a frustoconical feed tube with its greatest diameter at its bottom and a shelf feeder at the bottom of the feed tube.

17. Apparatus as defined in claim 15 wherein the combination A.C. agglomerator and widening gaseous path include a plurality of spaced annular plates of appreciable surface and low resistance positioned within the reactor and outside the frustoconical feed tube so that the shape of the feed tube provides the widening gaseous path.

References Cited

UNITED STATES PATENTS

| | | | |
|---|---|---|---|
| 2,726,998 | 12/1955 | Findlay | 201—20 |
| 3,100,146 | 8/1963 | Huntington | 55—9 |
| 3,224,954 | 12/1965 | Schlinger et al. | 208—11 |
| 3,244,615 | 4/1966 | Huntington | 208—11 |
| 3,247,092 | 4/1966 | Huntington | 208—8 |
| 3,231,486 | 1/1966 | Perry et al. | 208—10 |

NORMAN YUDKOFF, Primary Examiner

D. EDWARDS, Assistant Examiner

U.S. Cl. X.R.

201—20, 34; 202—117, 121